R. H. RICE.
GOVERNING MECHANISM FOR ELASTIC FLUID TURBINES.
APPLICATION FILED MAY 3, 1907.

951,337.

Patented Mar. 8, 1910.
6 SHEETS—SHEET 1.

Fig. 1.

Witnesses:
Marcus L. Byng.
J. Ellis Glen

Inventor
Richard H. Rice
By Albert G. Davis
Att'y.

R. H. RICE.
GOVERNING MECHANISM FOR ELASTIC FLUID TURBINES.
APPLICATION FILED MAY 3, 1907.

951,337.

Patented Mar. 8, 1910.
6 SHEETS—SHEET 2.

Fig. 2.

Witnesses:
Marcus L. Byng.
J. Ellis Glen

Inventor
Richard H. Rice,
By Albert G. Davis
Atty.

R. H. RICE.
GOVERNING MECHANISM FOR ELASTIC FLUID TURBINES.
APPLICATION FILED MAY 3, 1907.

951,337.

Patented Mar. 8, 1910.
6 SHEETS—SHEET 6.

Witnesses:
Marcus L. Byng.
J. Ellis Glen

Inventor:
Richard H. Rice,
By Albert G. Davis
Att'y.

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

GOVERNING MECHANISM FOR ELASTIC-FLUID TURBINES.

951,337.   Specification of Letters Patent.   Patented Mar. 8, 1910.

Application filed May 3, 1907. Serial No. 371,590.

*To all whom it may concern:*

Be it known that I, RICHARD H. RICE, a citizen of the United States, residing at Lynn, county of Essex, State of Massachusetts, have invented certain new and useful Improvements in Governing Mechanism for Elastic-Fluid Turbines, of which the following is a specification.

The present invention relates to governing mechanisms for elastic fluid turbines, more especially of the impact type, and has for its object to improve their construction.

I aim among other things to reduce the number of valves employed for controlling the admission of motive fluid to the turbine, or the passage of fluid between stages, or both, as the case may be. To this end, the valves are so arranged that they are capable of throttling the passage of fluid both in opening and closing, thereby supplying at all times an amount of steam in strict accordance with the load requirements. Further, each valve is made in two parts so that closer regulation may be obtained for a given number of valves and also that the work required to move the valves may be decreased. The small valves may, for convenience, be termed primary valves, and the large ones, secondary valves. Each primary valve is so arranged that it opens before and closes after its corresponding secondary valve. Each secondary valve is actuated through the medium of its primary valve, from which it will be seen that the primary valves not only act as such, but also serve as actuators thereby reducing the number of parts and the original cost, and also that of maintenance. The primary valves have stems which are positively moved, both in opening and closing, by levers and cams. The cams are mounted on a single shaft and the latter is rocked backward and forward, as occasion demands, by a continuously moving ratchet and pawl mechanism, in response to a governor sensitive to speed variations. The governor acts to connect said mechanism to the cam shaft for moving the valves and to disconnect said parts when the amount of steam flowing satisfies the load requirements. The valves are unbalanced as to pressure, and since it is necessary for the purpose of close regulation to accurately position both the primary and secondary valves with respect to their seats, a friction lock is provided for the cam shaft which is automatically locked when it is necessary to hold one or more valves in a given position, and unlocked when it is desired to move them. Under some conditions it is possible to do away with the means for locking and unlocking the said friction lock. In this case the lock partakes of the nature of a retarding device and constitutes a part of the load on the actuating mechanism. It should be so constructed and arranged as to prevent the valves from jumping and pounding.

For a more complete understanding of my invention, attention is directed to the specification and the claims appended thereto.

In the accompanying drawings, which illustrate one of the embodiments of my invention.

Figure 1:
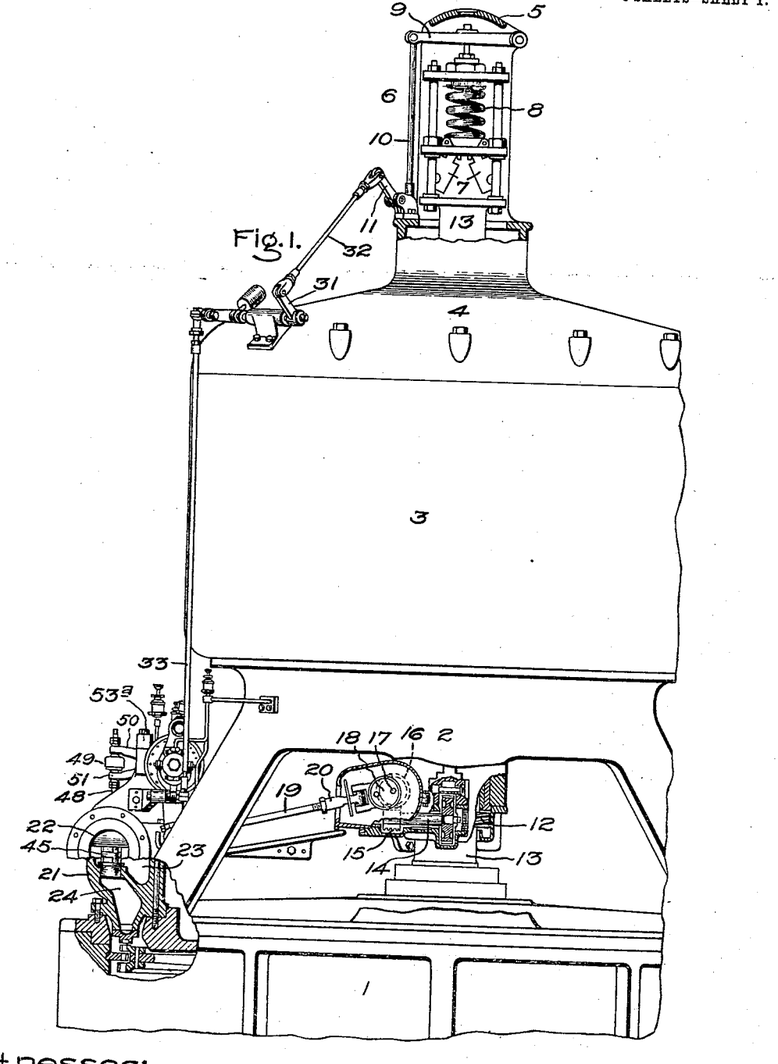
Figure 1 is a partial view in side elevation of a turbo-generator equipped with my improved governing mechanism.

1 indicates the upper end of a turbine upon which is located a stool 2 carrying an electric generator 3. The top of the generator is provided with a cover 4 that supports the dome 5, the latter inclosing a speed governor 6, comprising weights 7 and an opposing spring 8 mounted on the upper end of the main shaft 13 of the turbo-generator. Motion from the governor due to speed changes is transmitted by a rod to the horizontal lever 9, the latter being pivoted to the dome. The free end of the lever is connected by a rod 10 with a bell crank lever 11 supported by the base of the dome. The transmission of motion from this point to the valve actuating mechanism proper will be described later.

As it is necessary to have a constantly moving element which is ready at all times to assume the work of moving the valves, I mount a worm 12 on the main shaft 13 which also carries the governor. The worm meshes with a worm wheel on the secondary shaft 14. Mounted on the shaft 14 is a worm 15 meshing with a worm wheel 16, the latter being carried by a shaft 17, on the end of which is an eccentric 18. Surrounding the eccentric is a strap that is connected to the rod 19. As the eccentric revolves, it is evident that a to-and-fro movement will be imparted to the said rod. Since the position of the lever connected to the eccentric rod is changed from time to time by the governor in a plane perpendicular to that of the eccentric, a universal coupling 20 is included between the eccentric and its rod to compensate therefor.

Figure 2:
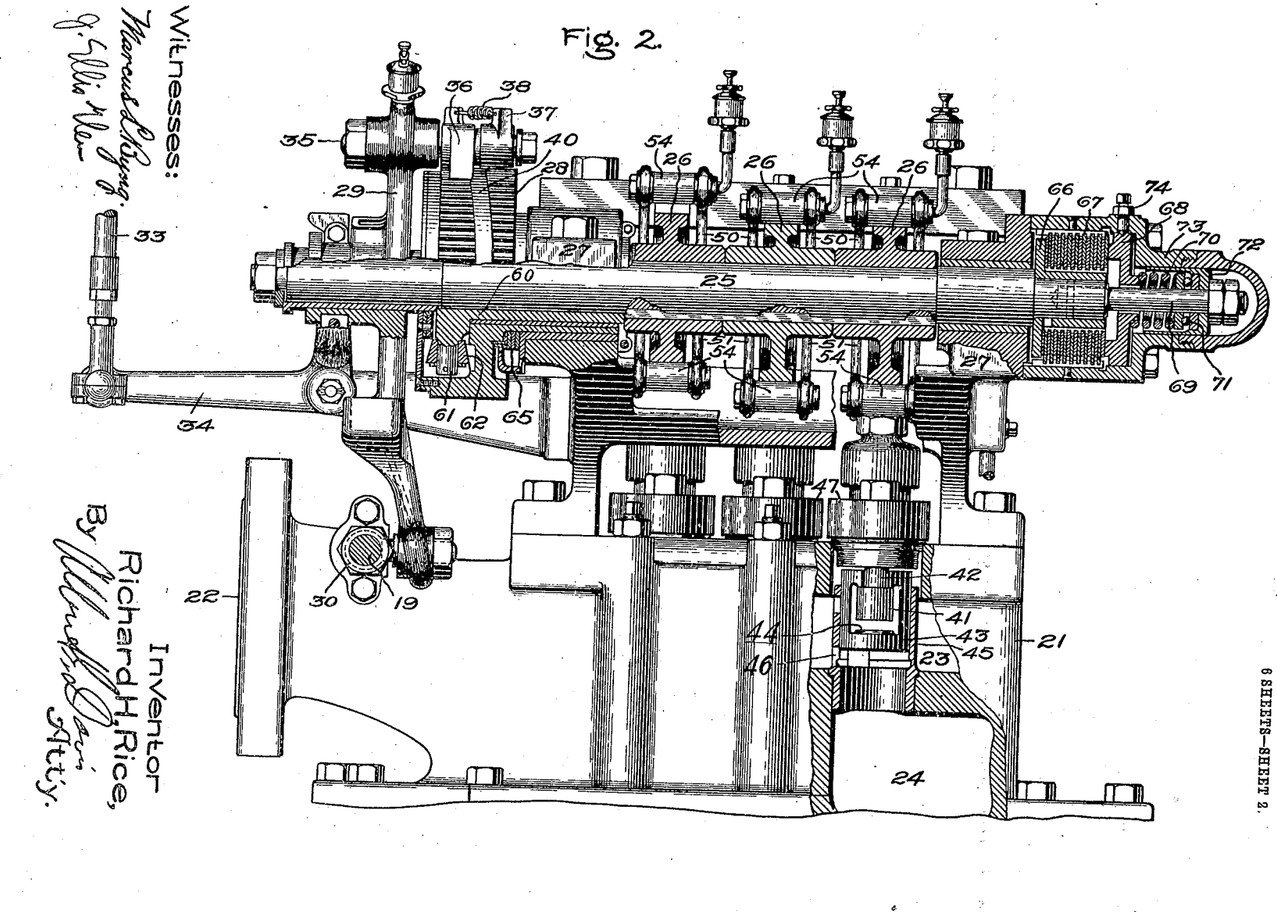
Fig. 2 is a longitudinal section of the cam shaft and coöperating parts.
Figure 6:
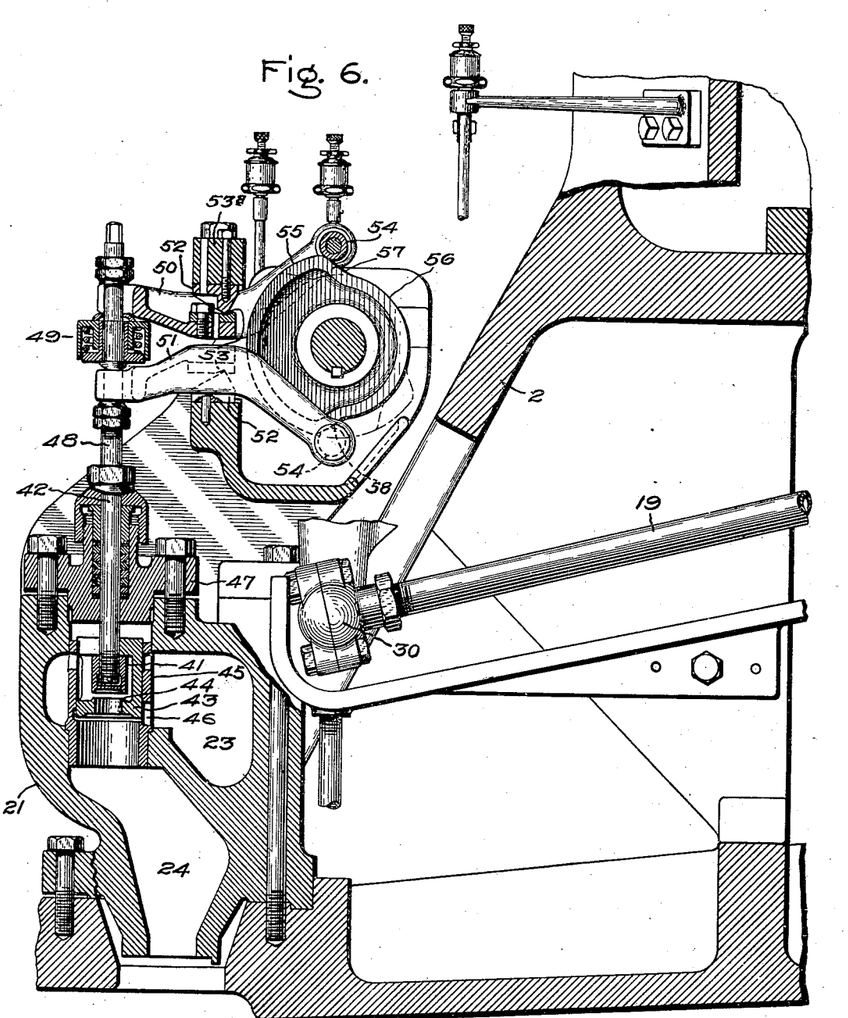
Fig. 6 is an enlarged view, in axial section, of a primary and a secondary valve and their actuating mechanism, and Figs. 7 to 10 inclusive are detail views of the means for releasing the lock on the cam shaft.

Mounted on the turbine casing is a valve chest 21, Figs. 2 and 6, having an inlet 22 that is connected with the boiler or other source of supply. In the chest is a supply chamber 23 containing a plurality of valves; in the present illustration three are shown. Each valve controls the passage of fluid to a passage 24, the latter supplying one, two or more fluid discharging passages of a nozzle or nozzles, or other fluid discharging devices. Situated above the valve chest is a horizontal shaft 25 upon which the cams 26, one for each valve, are mounted. The shaft is supported by bearings 27. On the left hand end of the shaft, Fig. 2, is a ratchet wheel 28, by means of which the cam shaft is actuated step-by-step in a forward or backward direction from a given position. When the mechanism includes a lock controlling means, the ratchet wheel is connected to the shaft through said means as will appear later, but if no such means is provided and a constantly acting frictional or other damping or retarding device is used, said wheel can be directly connected to the shaft.

Loosely mounted on the left end of the shaft 25, Fig. 2, is a pawl-actuating lever 29 which is freely oscillated about the axis of the shaft when the load conditions call for no change in the position of the valves which regulate the steam supply. This lever is oscillated from the main shaft by the above described worm gearing, the eccentric 18 and its rod 19. The outer end of the rod is connected by a ball-and-socket coupling 30 to the lower end of the lever 29. The longitudinal position of the lever 29 on the shaft is determined by the governor 6, Fig. 1, through the medium of the lever 9, rod 10, levers 11 and 31, rods 32 and 33, and the bell-crank lever 34, Fig. 2. The lever 34 is pivoted on a bracket secured to the valve chest and one end of said lever is forked to embrace the hub of the pawl-actuating lever 29.

Mounted on the lever 29 is a stud 35, the latter carrying pawls 36 and 37 extending in opposite directions from the axis of the stud and held in operative position with respect to the ratchet wheel by the extension spring 38, the said spring being attached to projections on the pawls. Inasmuch as there are times when the pawls should not act as well as times when they should—it being noted that the lever 29 is constantly vibrating—a special means is provided to keep the pawls out of engagement with the ratchet teeth when they should not work and to permit them to work when they should. This means comprises a shield or member 40 carried by the ratchet and presenting a smooth peripheral surface of the same diameter as the points of the ratchet teeth, and arranged to follow a spiral path with respect to the sides of the ratchet wheel. Any movement of the lever 29 on the shaft 25 will change the axial position of the pawls with respect to the shield, and it is this change in position that permits the pawls to engage the teeth of the ratchet and move the same. The pawls, due to their own weight, and the spring 38 tend at all times to enter into operative engagement with the ratchet teeth, which tendency is opposed by the shield so long as it is in a neutral position.

The cam shaft in practice usually moves at each step an angular distance equal to the pitch of the ratchet teeth, but under certain conditions it may move a distance equal to two, three, four, five or even more times the pitch of said teeth, depending upon the suddenness and the amplitude of the change of the load. Where the change in load is sudden and of large amount, the opening or closing of a secondary valve follows that of a primary valve so closely as to constitute in effect a single valve. The shield is of such a width, and so arranged, that when the flow of steam or other fluid past the valves exactly satisfies the load requirements, the corners of the pawls adjacent the shield will ride thereon and prevent said pawls from acting on the ratchet teeth. The arrangement of the pawls and shield is particularly effective since the pawl is either out of engagement or fully in engagement with the teeth thereby avoiding all troubles incident to broken teeth and pawls. Owing to the shape of and to the fact that the shield changes its position with respect to the pawls for each degree it is moved in either direction, it follows that the shield constitutes a follow-up device and prevents the over-travel of the valves and their actuating means.

Figure 3:
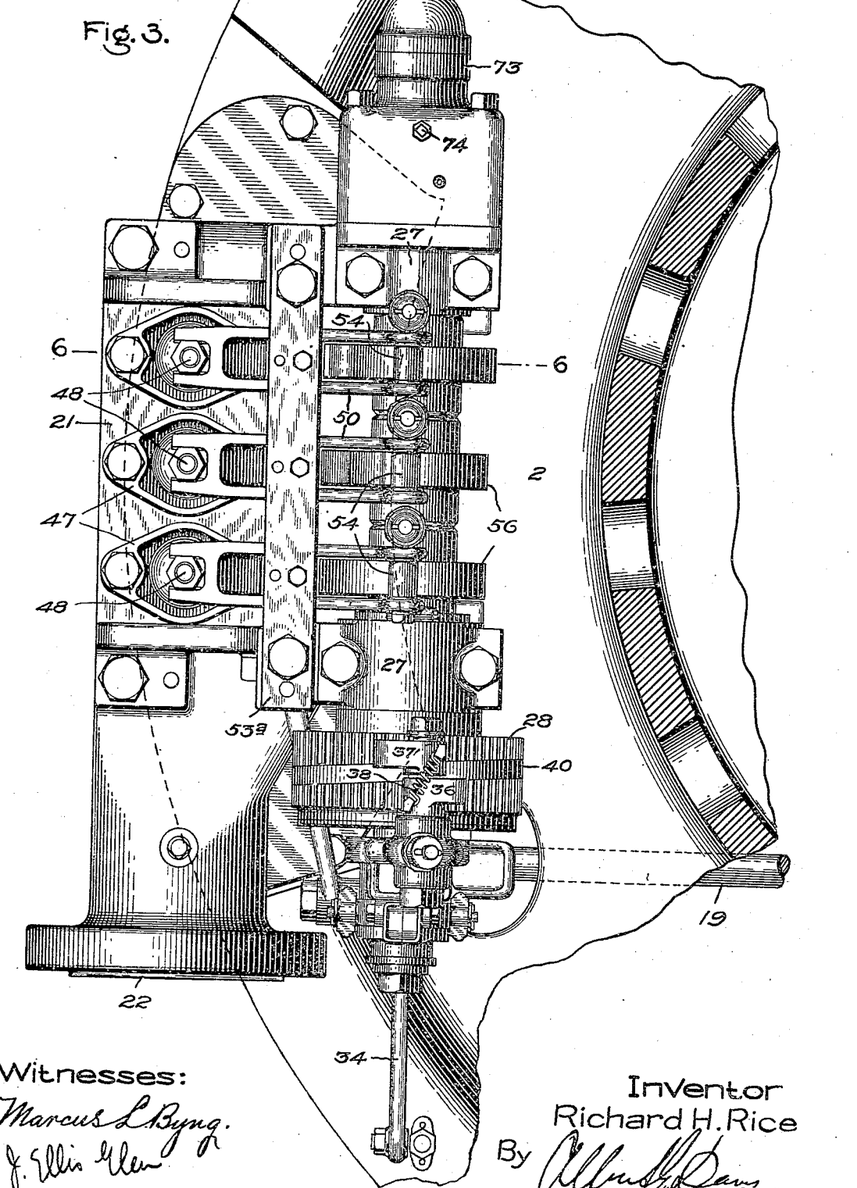
Fig. 3 is a plan view of the cams and the valve actuating parts.
Figures 4, 5:
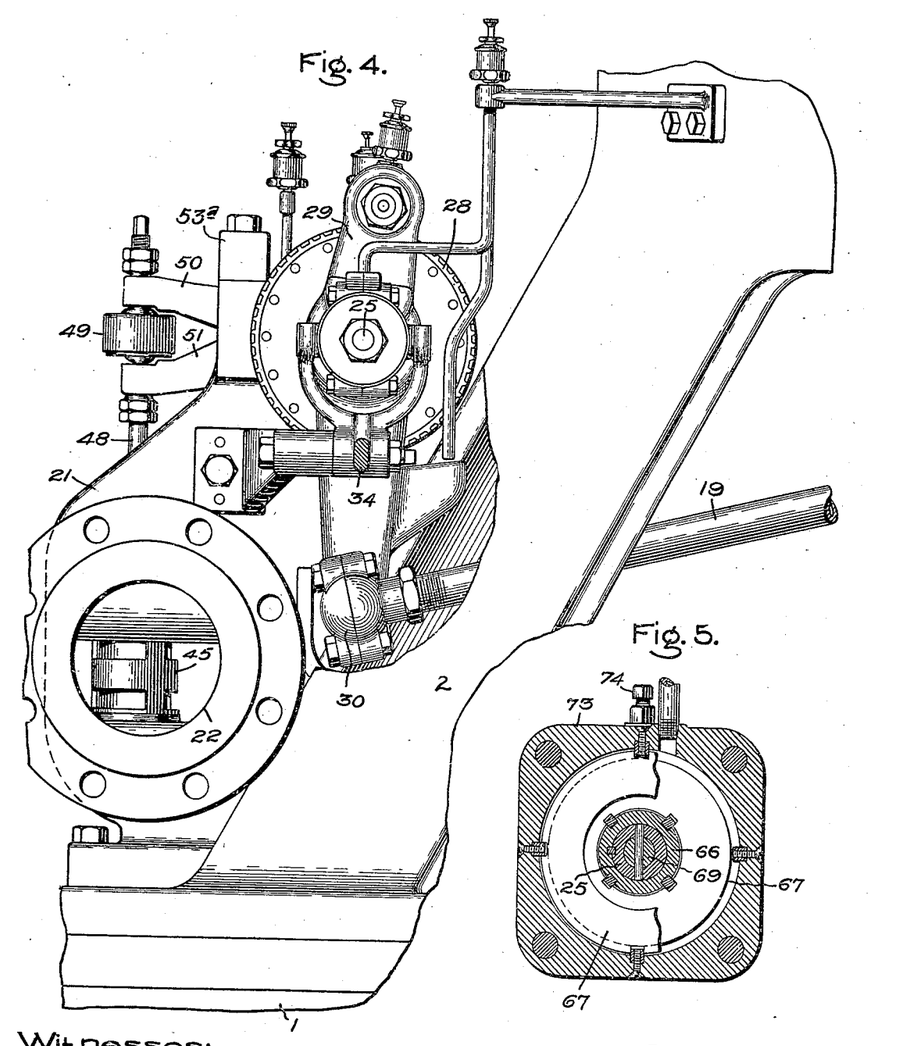
Fig. 4 is an enlarged view in end elevation of the same.
Fig. 5 is a detail sectional view of a friction clutch for holding the cam shaft and valves in proper positions.

Assuming the parts to be ready to operate the cam shaft (a condition best illustrated in Fig. 3) with the pawl-carrying end of the lever 29 moving to the left, Fig. 4, or as viewed from the bottom of sheet 3 of the drawings, the end of the pawl 37 will move off the shield 40 and, under the influence of the spring 38, engage a tooth on the ratchet wheel, thereby moving the same to the left or contra-clockwise, Fig. 4, say for example, a distance equal to the pitch of the teeth. The same movement of the lever will cause the pawl 36 to ride up onto the shield 40 if it is not already resting on said shield, the tooth directly under the end of the pawl lifting it against the action of the spring 38. Owing to this lifting action, the pawls will always ride onto the shield without shock of any kind. The movement of the ratchet wheel also moves the shield plate angularly about the axis of the shaft a distance equal to the pitch of the teeth and, on account of its spiral arrangement, its relation to and effect on the pawls are changed. Now on the return or backward stroke, the pawl 37 will be lifted by the tooth directly under the end of it and caused to ride on the shield. The pawl 36 will for a portion of its stroke also ride on the shield and at or about the end of said stroke may pass off of the shield, depending upon the position of the latter and whether or not the governor has altered the position of the pawl by moving it axially of the shaft and across the shield. In the event of the valve opening satisfying the load conditions, the latter pawl will stop just short of doing any work. Assuming the same conditions, the pawl 37 will do no work on the forward stroke because it will ride on the shield. This relation of parts will continue until there is a speed change when the governor will shift the pawls axially of the shaft in one direction or the other from the position described, and the next vibration of the lever 29 will move the ratchet wheel and cam shaft by an amount dependent upon the load and therefore the speed change.

The valves and their operating levers will next be described, see Fig. 6. Each valve comprises a primary valve 41 mounted on the stem 42 and located inside of the secondary poppet valve 43, the latter containing an internal seat 44 for the former. The secondary valve is made hollow and slotted at one side to receive the stem 42 and primary valve. Surrounding the secondary poppet valve is a sleeve 45 having one or more ports 46. This sleeve is seated in a wall of the valve chest and in addition to forming a seat, acts as a guide for the valve 43. These valves control the passage of motive fluid from the chamber 23 to the passage 24, the space above the primary valve being in communication with the chamber 23. The distance between the seat 44 and the top of the secondary valve is greater than the length of the primary valve, so that the latter will first open and permit an amount of motive fluid to flow dependent upon said opening and thereafter raise the secondary and larger valve so that fluid can flow through the port or ports 46. In closing, the secondary valve is first seated and then the primary. The sleeve 45 is of the same diameter as the opening in the wall of the valve chest above it so that it can be inserted or withdrawn from place. This opening is closed by a head 47 bolted to the wall of the chest and containing a packing with a packing gland and adjusting nut. The valve stem 48 rises vertically from the chest and includes a spring coupling 49 so arranged that it will yield slightly in case the cams are not exactly right or in case the parts are not assembled exactly as they should be. Motion is imparted from the cams to the valves by a series of levers. In the present illustration of the invention each lever is made up of two coöperating parts or levers 50 and 51 with the outer end of one above and of the other below the spring coupling 49, but under some conditions the levers may be made in one piece with a plurality of arms between which the cams and the couplings are located as in the form illustrated. The object in making the levers in two parts is to facilitate assembling and taking down, to afford better support therefor, to economize space, to afford room for the coupling, and to bring the pivots therefor near to the axis of the cam shaft. Mounted on the frame around the cam shaft are a series of blocks 52, two for each set of levers, having knife edges 53 which are seated in hardened blocks carried by the parts 50 and 51 of the levers. The blocks for the upper parts 50 of the levers are mounted on the removable bar 53$^a$, Figs. 2 and 6, forming a portion of the frame. The blocks and the seats are made removable so that they can be properly hardened and also so that they can be renewed. The inner ends of the levers are provided with anti-friction rollers 54 that travel on the surface of the cams 26, and the outer ends are forked to embrace the valve stems. Nuts are provided on the stems above and below the outer ends of the levers for the purpose of affording proper adjustment. The cams may be made of any suitable shape to accomplish the desired result. As shown, they comprise two principal portions 55 and 56 located at different distances from the center and connected by inclined portions 57 and 58. As one roller moves up the incline 57 the other moves down the incline 58, so that the valve stem is always held against jumping from one position to the other, and any desired degree of throttling can be obtained by properly shaping these inclined surfaces. As the cam shaft is rocked one way or the other, it follows that the valves will be correspondingly moved.

Starting with the parts in the position shown, a cam is moved step-by-step in a clock-wise direction and the upper roller will ride up the incline 57 and the upper or closing lever 50 will gradually lower the primary valve until the secondary valve is seated, and thereafter movement in the same direction will gradually close the primary valve. The roller on the lower or opening lever has, in the meanwhile, moved down the incline 58 and either permitted the upper lever to close the valves or else assisted in the closing, depending upon whether or not the roller is held in rolling contact with the cam. Usually both levers take part in the action, owing to the fact that the valves are subjected to unbalanced fluid pressures. The inclined portions of the several cams are angularly advanced, one with respect to another, so that the primary and therefore the secondary valves will open and close successively. After the rollers of a given pair of levers pass off of these inclined portions, further movement of the levers is prevented because the portions 55 and 56 of the cam are concentric and hence the cams and their shaft can move without affecting the position of said levers.

Figure 7:
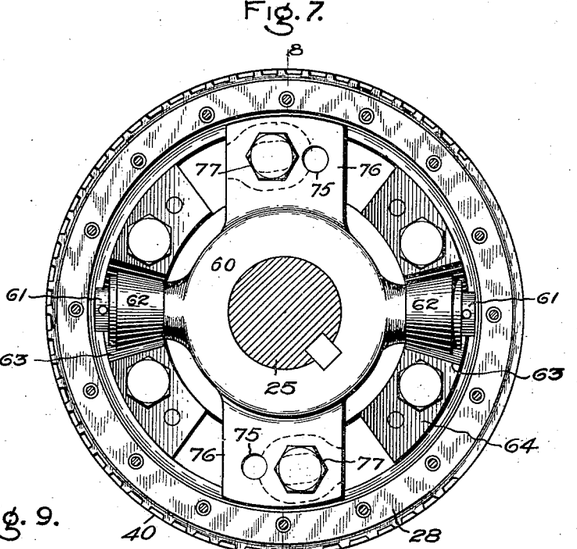
Figure 8:
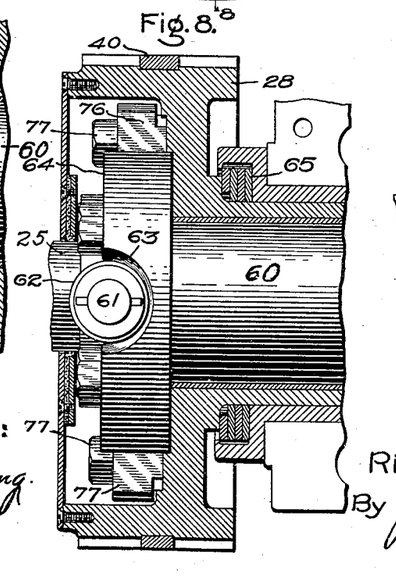
Figure 9:
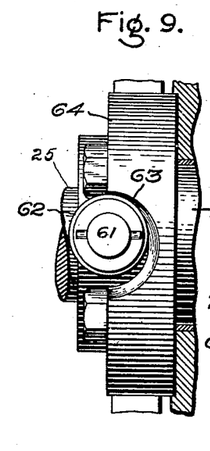
Figure 10:
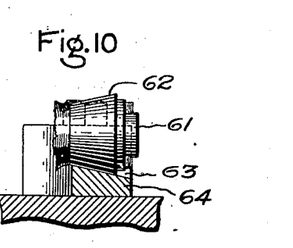

Reference has been made to a locking means for the cam shaft, and it will now be described in detail. Surrounding the cam shaft and located between it and the hub of the ratchet wheel 28, Fig. 2, is a sleeve 60, having two arms 61 thereon, Fig. 7, located at diametrically opposite points and each provided with a conical roller 62. These rollers are located in openings 63 of substantially semi-circular shape formed by cutting away the disk or head 64 formed on or rigidly attached to the inside of the ratchet wheel. The parts normally stand as shown in Figs. 2 and 8; that is to say when the pawls are moving to-and fro without moving the cam shaft. Between the right hand side of the ratchet wheel and the lining of the adjacent bearing 27 are hardened thrust washers 65, or rollers, or both. On the right hand end of the shaft, Fig. 2, and secured thereto is a sleeve 66 having a flange which forms an abutment for a plurality of thin steel disks 67 which form a part of a friction clutch. The sleeve is prevented from moving longitudinally to the left on the shaft 25 by means of a shoulder or equivalent device. On the right hand side of the disks is a fixed abutment 68. Between the abutment and adjustable head 72 on a rod 69 pinned to the end of the shaft 25 is a compression spring 70, a ball bearing 71 being provided to reduce the friction between the spring and the head. The bearing and spring are inclosed in a hollow cylindrical member projecting from said head 72 which is guided by the cylindrical wall of the inclosing casing 73. The abutment is held in position longitudinally and prevented from turning by the bolt 74. Half of the thin steel disks are splined to the sleeves 66 and so rotate with the shaft, while the remainder are splined to the casing 73 and are, therefore, prevented from rotating. The spring 70 is of such size and effect that it will, when the parts are not being moved by the action of the pawls 36 and 37, force the shaft 25, sleeve 66 and the disks 67 toward the right, Fig. 2, and hold said disks in frictional contact and the rollers 62 in the mid-position shown in Fig. 8, thus locking the cams and their coöperating valves against movement.

Assuming the parts to be locked and the pawl 36, Figs. 2 and 3, in position to move the ratchet wheel, the first portion of the active stroke of the pawl will move the wheel in a clock-wise direction and the rollers 62 will ride up the inclined or cam surfaces 63 in the disk 64, Figs. 7 to 10. Since the wheel is prevented from moving to the right by the thrust washers 65, it follows that the shaft 25 as a whole will, due to the rollers 62 moving up the inclines, move slightly to the left against the action of the spring 70 and relieve the frictional contact between the thin steel disks of the clutch, after which the shaft is free to rotate and with it the attached parts. As soon as a pawl lets go on its return stroke, the spring 70 will move the shaft to the right bringing the parts of the clutch into frictional contact and locking or holding the shaft 25 against further angular movement until one or the other of the pawls takes hold. Since the shaft must turn forward and backward, it follows that the locking device or clutch must be double acting. This is accomplished by making the cutaway or cam portions 63 on the head symmetrical on both sides of the center. No matter which way the ratchet wheel is turned, the rollers 62 will first release the lock or clutch and thereafter turn the shaft.

In some certain cases it may be desirable to omit the feature of the unlocking device, in which case the clutch will act as a retarding device at all times, and the pawls will overcome the load occasioned thereby. I may omit the unlocking device when the apparatus is to be operated in this manner, or it may be rendered inoperative by inserting pins in the holes 75, Fig. 7, in the arms 76 and clamping the parts by bolts 77. In this case the ratchet and shaft will at all times move as one. The bolts 77 pass through slots, shown in dotted lines, in the arms 76, and when not firmly secured in place may act as an additional means for preserving the proper alinement of the parts.

From the foregoing it will be seen that the lever 29, Fig. 2, is constantly vibrating to-and-fro due to its connection with the worm on the main shaft, Fig. 1, and the gearing driven thereby. The pawls 36 and 37, Fig. 3, stand ready at all times to perform the work of moving the cam carrying shaft 25, Fig. 2, when permitted to do so by the speed governor. After one or the other pawls moves the ratchet and the shaft, the spiral shield comes into play and, acting as a follow-up device, prevents over-travel of the parts. Assuming a given number of primary and secondary valves closed, and a given number open, and a slight increase in load accompanied by a decrease in speed, the action of a pawl in moving the cam shaft and its cams will cause one of the latter to open a primary valve by an amount dependent upon the load change. Further increase in load will open the primary valve by an additional amount. A continued increase in load will cause the primary valve to positively and mechanically open the secondary valve until the latter is wide open. As soon as one secondary valve is fully opened, the regulating action takes place on the next primary valve in the series and then the secondary and so on. Upon a decrease in load, assuming some of the valves to be fully open and the remainder closed, a secondary valve will start into operation and gradually throttle the supply until it is seated. If this is insufficient to satisfy the load requirements, the next primary valve closes gradually, and so on.

I do not claim the releasing means for the friction clutch nor the specific construction of the shield on the ratchet wheel for controlling the action of the pawls, since they were invented by John G. Callan and form the subject matter of a separate application, Serial No. 433,348, filed May 18, 1908.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,

1. In a governing mechanism, the combination of a primary and a secondary valve, an actuator for operating the primary valve and through it the secondary valve, a means which is operative at any point throughout the range of operation of the actuator to lock said actuator against the tendency of the valves to move it, and a governor responsive to load changes for controlling the action of the actuator on the valves.

2. In a governing mechanism, the combination of a primary and a secondary valve which have a tendency to move, due to unbalanced pressures, an actuator which opens one valve before the other, a locking device which is operative to hold the actuator at any point throughout the range of operation of said actuator to prevent the valves from moving it, a power driven means for moving the actuator, and a governor controlling the action of the said means.

3. In a governing mechanism, the combination of a plurality of primary and secondary valves, stems for opening each primary valve before its coöperating secondary valve, which stems open for the primary valves between the opening of secondary valves, means for moving the stems in a manner to cause the valves to throttle the flow of fluid, power driven means which is constantly in motion, and a governor for connecting and disconnecting the first mentioned means and the power driven means.

4. In a governing mechanism, the combination of a plurality of primary and secondary valves, stems for opening each primary valve before its coöperating secondary valve, means for actuating the said stems in such a manner as to throttle the flow of fluid, which stems open the primary valves between the opening of secondary valves, a power driven means that is constantly in motion, a governor for connecting and disconnecting the first mentioned means and the power driven means, and a device acting on said first mentioned means for holding each of the valves in its throttling positions.

5. In a governing mechanism, the combination of a primary and a secondary valve, a stem for operating the primary valve and through it the secondary valve, a cam for moving the stem, a shaft carrying the cam, a lock for the shaft which is operative in any one of the various positions of said shaft to prevent the valves from turning it, and a governor controlled means for actuating the shaft.

6. In a governing mechanism, the combination of a plurality of valves, an actuating means for the valves including a shaft, and a device for holding the shaft in any one of its various positions comprising disks normally held in frictional contact, and a governor controlled means for moving the shaft.

7. In a governing mechanism, the combination of a plurality of valves, an actuating means for the valves including a shaft, and a device for holding the shaft in any one of its various positions comprising disks normally held in frictional contact, which device actuates the shaft and also controls the operation of said disks.

8. In a governing mechanism, the combination of a plurality of valves, cams for operating them, a shaft carrying the cams, governor controlled means for actuating the shaft step-by-step, and a locking device for the shaft comprising metal disks normally held in frictional contact.

9. In a governing mechanism, the combination of a plurality of valves, cams for operating them, a shaft carrying the cams, governor controlled means for actuating the shaft step-by-step, a locking device for the shaft comprising metal disks normally held in frictional contact, and a spring which tends at all times to hold the disks in contact.

10. In a governing mechanism, the combination of valves, stems for the valves, levers connected at one end with the stems, cams which actuate the other ends of the levers to open and close the valves, knife edge pivots for the levers that are arranged intermediate their ends, and governor controlled means for actuating the cams.

11. In a governing mechanism, the combination of a valve, a stem therefor, a cam, levers moved by the cam for opening and closing the valve, a knife edge pivot for one of the levers located above said lever, a second knife edge pivot for the other lever located below it, and governor controlled means for actuating the cam.

12. In a governing mechanism, the combination of a valve, a stem therefor, a set of levers for actuating the valve through its stem, pivots for the set of levers arranged above and below it, a cam which coöperates with adjacent ends of the levers and is situated between said ends, means for actuating the cams step-by-step, and a governor controlling said means.

13. In a governing mechanism, the combination of a valve, a stem therefor, a yielding means mounted on the stem, a pair of levers for actuating the valve, one of which acts on said means on one side and the other on the opposite side, pivots for the levers, a cam acting on the ends of the levers away from the stem, one portion of said cam acting to raise the stem and its valve through one lever and another portion to close it through the other lever, and a governor controlled means for actuating the cam.

14. In a governing mechanism, the combination of a primary and a secondary valve, a lever which gradually opens and closes the valves one after the other to throttle the passage of fluid, a means for moving the lever, a friction device to prevent the valves from affecting the position of the lever and its actuating means, and a governor controlling the action of said means.

15. In a governing mechanism, the combination of a plurality of primary and secondary valves arranged in pairs, a stem for each pair, levers for actuating the stems, a shaft, cams for actuating the levers which are mounted on the shaft, an actuator for the shaft, a frictional retarding device for the shaft, and a governor controlled means for actuating the shaft step-by-step in both the forward and reverse directions.

16. In a governing mechanism, the combination of a valve, a stem therefor, a cam for actuating the stem, a shaft upon which the cam is rigidly mounted, a ratchet on the shaft, pawls for moving the ratchet forward and to rotate the shaft and cam, a device having a to-and-fro movement for actuating the pawls, a shield for the ratchet assisting to control the action of said pawls, and a governor which acts on said pawls to primarily control their action.

17. In a governing mechanism for an elastic fluid turbine, the combination of a plurality of primary valves, a secondary valve for each primary, fluid discharging devices receiving fluid from a primary and a secondary valve, a means for slowly opening the primary valves and thereby throttling a given supply of fluid to one or more of the said devices during the operation of the turbine, and subsequently opening the secondary valves and thereby throttling a larger supply of fluid to one or more of the said devices during said operation, means for actuating the primary and secondary valves one after the other in opening and one after the other in the reverse order in closing, and a governor controlling the action of said means.

In witness whereof, I have hereunto set my hand this first day of May, 1907.

RICHARD H. RICE.

Witnesses:
JOHN A. McMANUS, Jr.,
HENRY O. WESTENDARP.